(12) United States Patent
Tharmananthar et al.

(10) Patent No.: US 10,515,375 B2
(45) Date of Patent: Dec. 24, 2019

(54) REHYPOTHECATION SYSTEM AND METHOD

(75) Inventors: Kuhanandha Tharmananthar, London (GB); Kirit Bhatia, Loughborough (GB); John Rivett, Leigh Tonbridge (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 1694 days.

(21) Appl. No.: 12/533,263

(22) Filed: Jul. 31, 2009

(65) Prior Publication Data
US 2010/0030705 A1    Feb. 4, 2010

Related U.S. Application Data

(60) Provisional application No. 61/085,563, filed on Aug. 1, 2008.

(51) Int. Cl.
| | |
|---|---|
| *G06Q 40/00* | (2012.01) |
| *G06Q 40/06* | (2012.01) |
| *G06Q 30/02* | (2012.01) |

(52) U.S. Cl.
CPC .................. *G06Q 30/02* (2013.01)

(58) Field of Classification Search
CPC ............................ G06Q 40/06; G06Q 40/025
See application file for complete search history.

(56) References Cited

U.S. PATENT DOCUMENTS

| | | | | |
|---|---|---|---|---|
| 5,802,499 A | * | 9/1998 | Sampson | G06Q 40/02 705/35 |
| 6,018,721 A | * | 1/2000 | Aziz | G06Q 40/025 705/36 R |
| 7,139,730 B1 | * | 11/2006 | Shimko | G06Q 40/00 705/35 |
| 2003/0144940 A1 | | 7/2003 | Kochansky et al. | |
| 2004/0039666 A1 | * | 2/2004 | Fudali et al. | 705/35 |
| 2005/0065871 A1 | | 3/2005 | Gerhart et al. | |

(Continued)

OTHER PUBLICATIONS

Public Law 112-29, "Leahy-Smith America Invents Act", Sep. 16, 2011, 4 pgs.*

(Continued)

*Primary Examiner* — Bruce I Ebersman
*Assistant Examiner* — David P Sharvin
(74) *Attorney, Agent, or Firm* — Greenblum & Bernstein, P.L.C.

(57) ABSTRACT

Embodiments of the invention are directed to a computer-implemented rehypothecation system and method for facilitating automatic collateral re-use between system participants, wherein the system participants include borrowers, lenders, and lender/borrowers, the system comprising. The system may additionally include an allocation engine for automatically performing allocation runs for redistribution of collateral, the allocation engine comprising collateral distribution components for assigning collateral to lenders and lender/borrowers based on borrower-selected parameters and an eligibility filter for verifying each assignment of collateral in accordance with lender requirements. The system may further include a global synchronization engine for pre-determining timing of allocation runs to enable global collateral re-use across time zones.

10 Claims, 9 Drawing Sheets

(56) References Cited

U.S. PATENT DOCUMENTS

2005/0209939 A1* 9/2005 Joseph et al. .................. 705/31
2006/0242045 A1 10/2006 Muldowney
2007/0016518 A1 1/2007 Atkinson et al.
2007/0106601 A1 5/2007 Shepherd

OTHER PUBLICATIONS

Section 14 of the Leahy-Smith America Invents Act, Public Law 112-29, Sep. 16, 2011.*
Monnet, Cyril; "Rehypothecation" 4th Quarter 2011, pp. 18-25, Federal Reserve Bank of Philadelphia Business Review (Year: 2011).*
U.S. Appl. No. 11/681,608, filed Mar. 2, 2007.
Form PCT/ISA/210, International Search Report, dated Mar. 16, 2010.

* cited by examiner

REHYPOTHECATION SYSTEM AND METHOD

PRIORITY

This application claims priority from provisional application Ser. No. 61/085,563 filed on Aug. 1, 2008.

TECHNICAL FIELD

Embodiments of the invention are related generally to systems and methods for facilitating collateral re-use in the financial industry.

BACKGROUND OF THE INVENTION

Rehypothecation is the ability to re-use assets that one has received as collateral against an obligation of one's own. Rehypothecation is standard practice in the bilateral market. For example, as illustrated in FIG. 2, two parties A and B have a relationship where A acts as the Borrower and B as the Lender. A delivers collateral to B to meet an obligation against borrowed cash or stock. B then re-uses, or rehypothecates, the collateral to satisfy its own obligation with C. C performs the same exercise as B, satisfying an obligation with D. D is the final lender in the 'rehypothecation chain'. This concept can be extended, with multiple re-use branches across many different counterparties.

Historically, participants in the securities lending and repurchase agreement lending markets have received and re-used assets. This re-use was facilitated in the eighties with the dematerialization of securities markets and the deregulation regarding registration and reporting. However, collateral re-use can lead to a problem in satisfying recalls. When a relatively illiquid asset has been re-used a number of times and then is recalled, satisfying that request can be difficult. Each counterparty along the chain must recall the security or go into the market and borrow it in the market. With market movements required for every step, sometimes the asset is not recalled quickly enough.

In many ways, the continual re-use of assets is what led to the development of tri-party service with its greater certainty of recall. The tri-party space involves the introduction of agent acting as an intermediary between the contracting parties. The greater certainty stems directly from the fact the assets held in favour of the lender are under the control of the tri-party agent and are not re-used.

Rehypothecation is a relatively new product in the tri-party space and while it unlocks the value in the assets held by lenders, it does, inevitably, introduce some of the risks that exist in the bilateral market. Current providers have attempted to reduce these risks, primarily by limiting the options available to either the borrower or the lender. One currently available system only allows one-step rehypothecation. Other systems allow unlimited re-use but are limited in the types of assets they support.

Thus, a solution is needed that provides a fully automated, unlimited re-use product that allows multiple asset types. Further, a system is needed that clearly assigns voting and income rights with respect to the collateral introducer and collateral receiver. Additionally, the system should be operable regardless of the type of underlying obligation.

SUMMARY OF THE INVENTION

In one aspect of the invention, a computer implemented system is provided for facilitating automatic collateral re-use between system participants, wherein the system participants include borrowers, lenders, and lender/borrowers. The system includes an allocation engine for automatically performing allocation runs for redistribution of collateral. The allocation engine comprises collateral distribution components for assigning collateral to lenders and lender/borrowers based on borrower-selected parameters and an eligibility filter for verifying each assignment of collateral in accordance with lender requirements. The rehypothecation system further includes a global synchronization engine for pre-determining timing of allocation runs to enable global collateral re-use across time zones.

In an additional aspect of the invention, a computer-implemented rehypothecation system for facilitating automatic collateral re-use between system participants is provided. The system participants include borrowers, lenders, and lender/borrowers. The system includes an allocation engine for automatically performing allocation runs for redistribution of collateral, the allocation engine comprising collateral distribution components for assigning collateral to lenders and lender/borrowers based on borrower-selected parameters and an eligibility filter for verifying each assignment of collateral in accordance with lender requirements. The rehypothecation system further includes stored rules implemented by a processor for execution of allocation runs, the stored rules allowing an unlimited number of re-use instances of each collateral asset and restricting each collateral asset from being rehypothecated by a single participant more than one time, the stored rules further permitting rehypothecation of both equity and non-equity assets.

In yet an additional aspect of the invention, a computer-implemented method is provided for facilitating automatic collateral re-use between system participants through a rehypothecation system. The system participants include borrowers, lenders, and lender/borrowers. The method includes implementing a global enrollment engine for enrollment of the system participants, the global enrollment engine requiring execution of legal documents. The method further includes entering collateral assets designated by each participant into the rehypothecation system and predetermining scheduling of allocation runs using a global synchronization engine for facilitating participation by system participants in multiple different time zones. Furthermore, the method comprises automatically performing the scheduled allocation runs for redistribution of the entered collateral by assigning collateral to lenders and lender/borrowers based on borrower-selected parameters and an implementing an eligibility filter for verifying each assignment of collateral in accordance with lender requirements.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a rehypothecation system for re-using received collateral that allows lenders to generate returns on held assets rather than holding a long inventory. For borrowers, the rehypothecation system facilitates collateral upgrade trades. Borrowers may be able to negotiate favorable fees since lenders can re-use their received assets.

Figure 1:
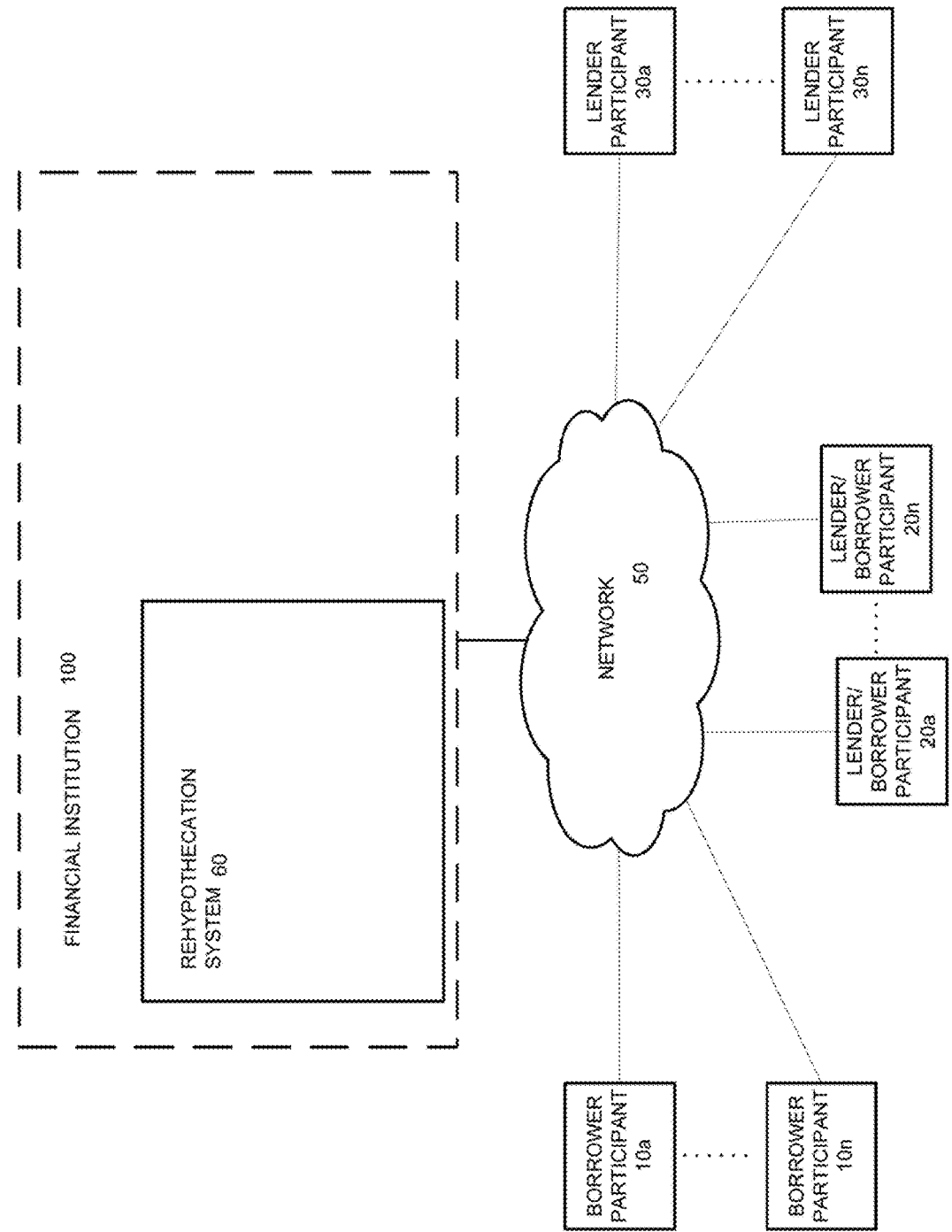
FIG. 1 is a block diagram illustrating an operating environment for a rehypothecation system in accordance with an embodiment of the invention.
Figure 2:
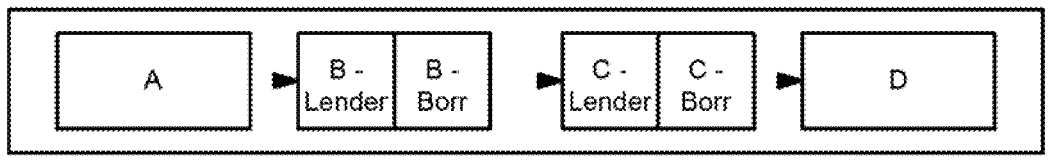
FIG. 2 is a block diagram illustrating an existing rehypothecation scenario.

FIG. 1 is a block diagram illustrating an operating environment for a rehypothecation system 60 in accordance with an embodiment of the invention. The rehypothecation system 60 may be operated by a financial institution 100. The financial institution 100 and rehypothecation system 60 may be connected over a network 50 with system participants. The system participants may include borrower participants 10a ... 10n, lender/borrower participants 20a ... 20n, and lender participants 30a ... 30n. Participants are enrolled in the rehypothecation system 60 and are actively involved in rehypothecation.

Borrower participants 10a ... 10n are collateral providers and lender participants 30a ... 30n are collateral receivers. Lender/borrower participants 20a ... 20n are participants who both receive collateral and provide collateral. Thus, the lender/borrower participants 20a ... 20n re-introduce assets that they have received in their role as lenders. Lender/borrower participants 20a ... 20n enrolled in the system actively re-use assets received through the lending business. Despite the fact that in order to participate, parties must be enrolled in the system, the financial institution or other organization operating the rehypothecation system can operate on assets that it does not hold as long as the parties grant contractual control over the assets.

Figure 3:
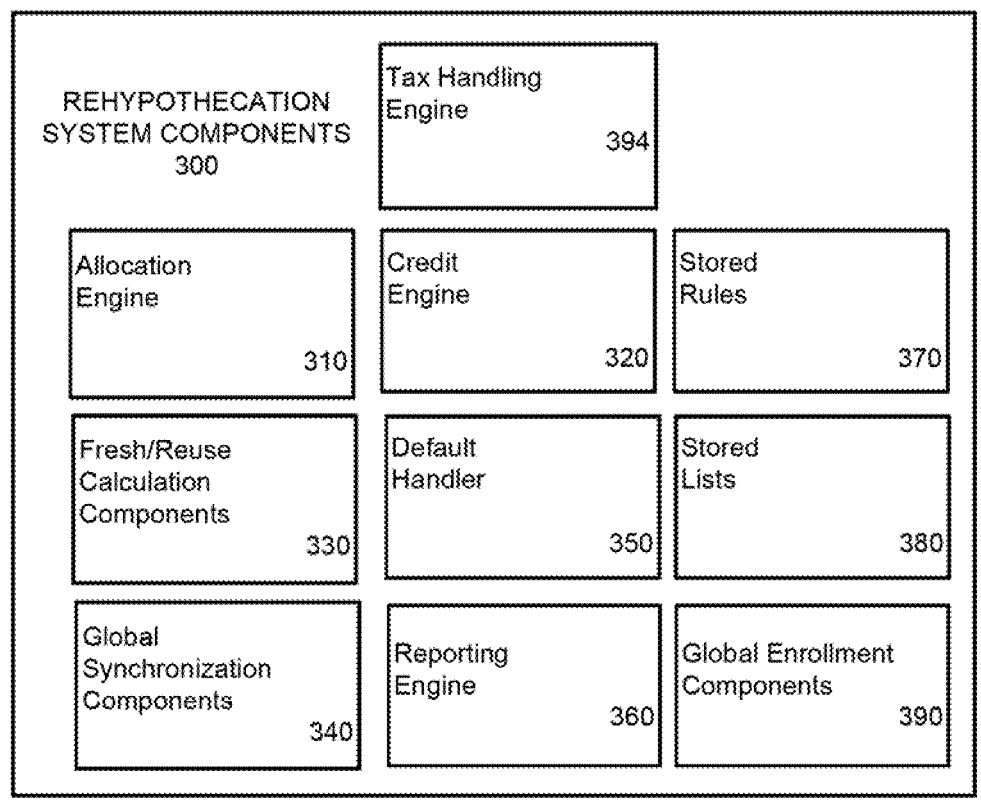
FIG. 3 is a block diagram illustrating rehypothecation system components in accordance with an embodiment of the invention.

Rehypothecation is accomplished using a number of engines and components, which will be described in greater detail below with reference to FIG. 3. Rehypothecation system components 300 may include an allocation engine 310, credit engine 320, fresh-re-use calculation components 330, global synchronization components 340, a default handler 350, and a reporting engine 360. The rehypothecation system components 300 may further include stored rules 370, stored lists 380, global enrollment components 390, and a tax handling engine 394. These components may be combined into a lesser number of components performing the same functions. Furthermore, additional components may be included.

The allocation engine 310 operates to redistributed collateral based on borrower and lender criteria by performing allocation runs for the system. A goal of collateral allocation is to allocate securities as collateral from participant long boxes and collateral accounts to lender collateral accounts, maximizing the rehypothecation of received collateral and optimizing the use of borrower's own, fresh collateral. The allocation engine 310 may, in embodiments of the invention, have functionality similar to that described in commonly owned U.S. Pat. No. 7,480,632 to Fudali et al, which is hereby incorporated by reference. The allocation engine 310 is described in greater detail below with respect to FIGS. 4, 6A, and 6B. While the allocation engine 310 handles the actual allocation process, the other displayed components handle pre-allocation and post-allocation requirements. These components thus operate in addition to and/or in conjunction with the allocation engine 310.

The credit engine 320 provides a line of credit to eligible participants and will be further described below in connection with FIG. 9 below. Typically, upon enrollment, participants will be required to sign a legal document that governs the secured credit line facility. This credit line facility will provide a temporary line of credit between allocation runs. The system may charge a fee for the secured credit line facility and in the unlikely event that credit is extended overnight, secured credit may be charged at a different rate to unsecured.

The rehypothecation system 300 also includes fresh-re-use calculation components 330 that execute holistic calculations before each allocation run begins. These calculations provide the system with the most efficient balance between fresh collateral and re-use collateral. The following simple equation may be used as a base for calculating the minimum fresh collateral required $$\text{MinimumFresh} = \text{TotalBorrowing} - \text{TotalLending}. \quad (1)$$

This calculation for each participant, used in conjunction with a picture of the entire rehypothecation system, allows the system to complete the minimum fresh calculation for all participants in the system. The more actively rehypothecating participants enrolled, the greater the efficiency of collateral use. However, if a participant is a net lender, it is possible that the participant may not be required to contribute any fresh collateral.

The rehypothecation system 300 additionally includes the global enrollment component 390 and the global synchronization components 340, which ensure operation of the rehypothecation system 300 on a global basis. The global enrollment components 390 may facilitate a number of steps that must be completed before an applicant becomes a participant. Applicants may be required to sign legal documentation to receive and introduce assets. New relationships introduced by applicants must be covered by the existing legal documentation. The legal documentation may include, for example, a combination of a market standard Securities Lending Agreement (OSLA, GESLA, MEFISLA or GMSLA) and an Escrow Agreement (EA) or a Global Master Repurchase Agreement (GMRA) and a Collateral Management Repo Agreement (CMRA). The participant must specify from which of its escrows it wishes to re-use assets. Any eligibility set-up must be completed. The global enrollment components 390 add each new participant and its relevant relationships to the scheduled rehypothecation run. The global enrollment components 390 may enroll participants in multiple markets and across continents. For example, the global enrollment components 390 may permit enrollment in markets including for example, the UK, the US, Singapore, Hong Kong, Australia, Hungary, Sweden, Norway, Switzerland. Currently all agreements are preferably signed under the law of one country, for example, UK law.

The global synchronization components 340 operate to ensure a fixed schedule of allocation runs throughout the day. The timing of this schedule is based on current participant behaviour, global market cut-offs, and performance. The global synchronization components 340 operate to keep participants informed with respect to the allocation run schedule. The global synchronization components 340 may also control the timing of recall execution. The time at which a recall will be executed, rather than being based on what kind of run is launched, may be based on a lead-time, specified by the participant, to market cut-off. Allocation runs may potentially continue until the close of business for the United States or another global market. Internally, the global synchronization components 340 may consult a list of markets in the system where rehypothecation cannot be performed by the system.

In embodiments of the invention, the global synchronization components 340 track the beginning and ending of the trading day for each transaction. The trading day may, for example, be based on three time zones created to individually encompass Asia, Europe, and the Americas. Thus, the global synchronization components 340 define an overnight period for each of these time zones and determine where overlap occurs between the different time zones. During these overlapping periods, greater efficiencies can be achieved by identifying shortages in one time zone market and securities becoming available in another time zone.

The tax handling engine 394 is instrumental in ensuring that participants do not suffer adverse impact through global tax handling. Furthermore, the tax handling engine is capable of dictating tax treatment for both equity and non-equity assets, which can both be rehypothecated through the system 300. Historically, complicated tax consequences have restricted rehypothecation of equity assets.

The default handler 350 is provided to control the participant default process. For example, in a scenario involving multiple participants A, B, C, D, and E, an asset may be passed along a rehypothecation chain all the way from A, through the other participants, to E. If participant C is declared to be in default, this new status is reflected in the system. The asset continues to be delivered from A to B; B to C; C to D; and D to E. The system will allow D to freely allocate the security to any of its lenders and beyond. If C's default is confirmed, B is responsible for returning 'like collateral' to A. Once B does so, A and B drop out of the chain. The asset is then "re-attributed" to D, redefining D as the original collateral introducer. Thus, D is now disconnected from C, isolating C completely. The default handler 350 regulates the described process and holds participants responsible for their immediate counterparts. Default handling is described in greater detail below with reference to FIGS. 10A-10C.

The reporting engine 360 may generate reports for system participants. For borrower reports, assets re-used by borrowers may be distinguished from those introduced by borrowers. Reports do not enable participants to see whether or not they have been collateralised by a rehypothecated security. Reports may include a rehypothecation long box report that operates over a chosen lender/borrower's long box. The report will show, to a particular participant, what assets are left in the participant's long box and notional long box. A rehypothecated assets report tells the lender/borrower what assets have been allocated and whether they were 're-use' assets or fresh assets.

The reporting engine 360 may additionally or alternatively support feeds, which provide an alternate way for participants to receive information regarding their collateral positions. Feeds may be generated independently of the actual allocation run and optimally contain all settled movements since the last feed. There will be no netting of movements. The feed will split when a particular predetermined number of movements is reached.

The stored rules 370 and stored lists 380 store rules and lists necessary to the operation of the above-described components. The stored rules and lists 370, 380 may for example include limits on rehypothecation, such as the system wide limitation described below with reference to FIG. 9. Additionally, a rule against rehypothecation of the same asset twice by a single party is stored. Furthermore, a snapshot of the entire system after each allocation run may be stored. Storage may also be provided for lists of participants, eligibility requirements set by lenders, requirements set by borrowers, lists of included accounts provided by participants, etc. This information may also or alternatively be stored in other locations within the system and may be integral with one or more of the system components described above.

Figure 4:
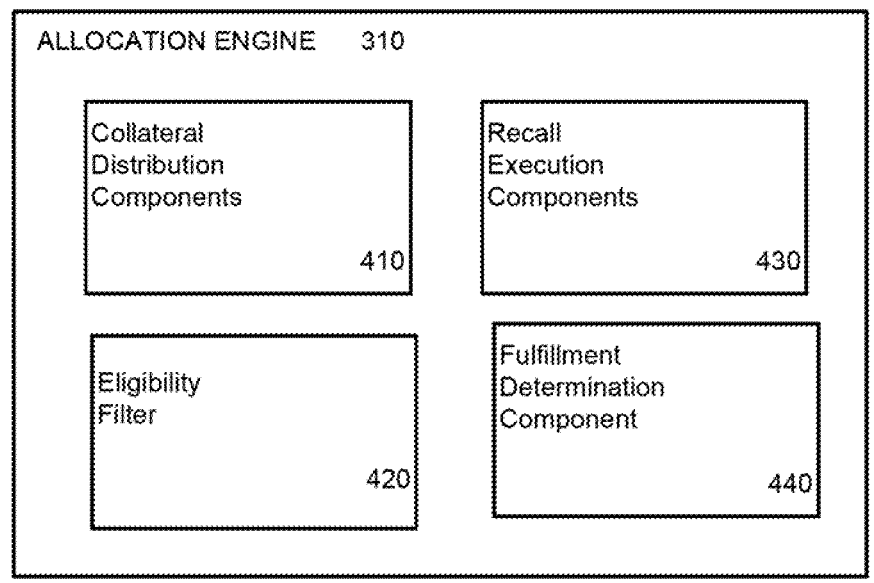
FIG. 4 is a block diagram illustrating an allocation engine in accordance with an embodiment of the invention.

FIG. 4 illustrates further details of the allocation engine 310. The allocation engine 310 may include collateral distribution components 410, eligibility filter 420, recall execution components 430, and fulfillment determination component 440.

The collateral distribution components 410 implement two key parameters set by each borrower participant. These parameters include a Borrower Quality Ranking (BQR) and Lender Weighting (LW). In accordance with the BQR, the collateral distribution components 410 allocate the 'lowest' collateral, as defined by the borrower, first and then move up the ranking. In accordance with the LW, the collateral distribution components 410 begin with an initial lender, as defined by the borrower, and then move along the lender population. Thus, the allocation engine 310 delivers securities in prioritized order based on the BQR and LW.

The eligibility filter 420 operates based on pre-set lender parameters. Individual lenders specify which securities they are willing to take and under what concentration, thereby defining eligibility. Eligibility operates as a filter through which all collateral must pass before the collateral can be allocated to a lender.

The recall execution components 430 operate when a borrower participant who is a collateral introducer requests a market recall. The recall execution components 430 will attempt to meet all recalls by using the specified securities last. The recall execution components 430 are described further below with reference to FIGS. 7 and 8.

The fulfilment determination components 440 confirm that all obligations of participants in the system have been met. The process of allocation continues until all obligations are met or the borrower's available securities are exhausted. The fulfilment determination components 440 will mark allocation runs as successfully completed if all obligations are met or none of the lenders are left uncollaterized or 'worse off' than they were at the start of the run.

Figure 5:
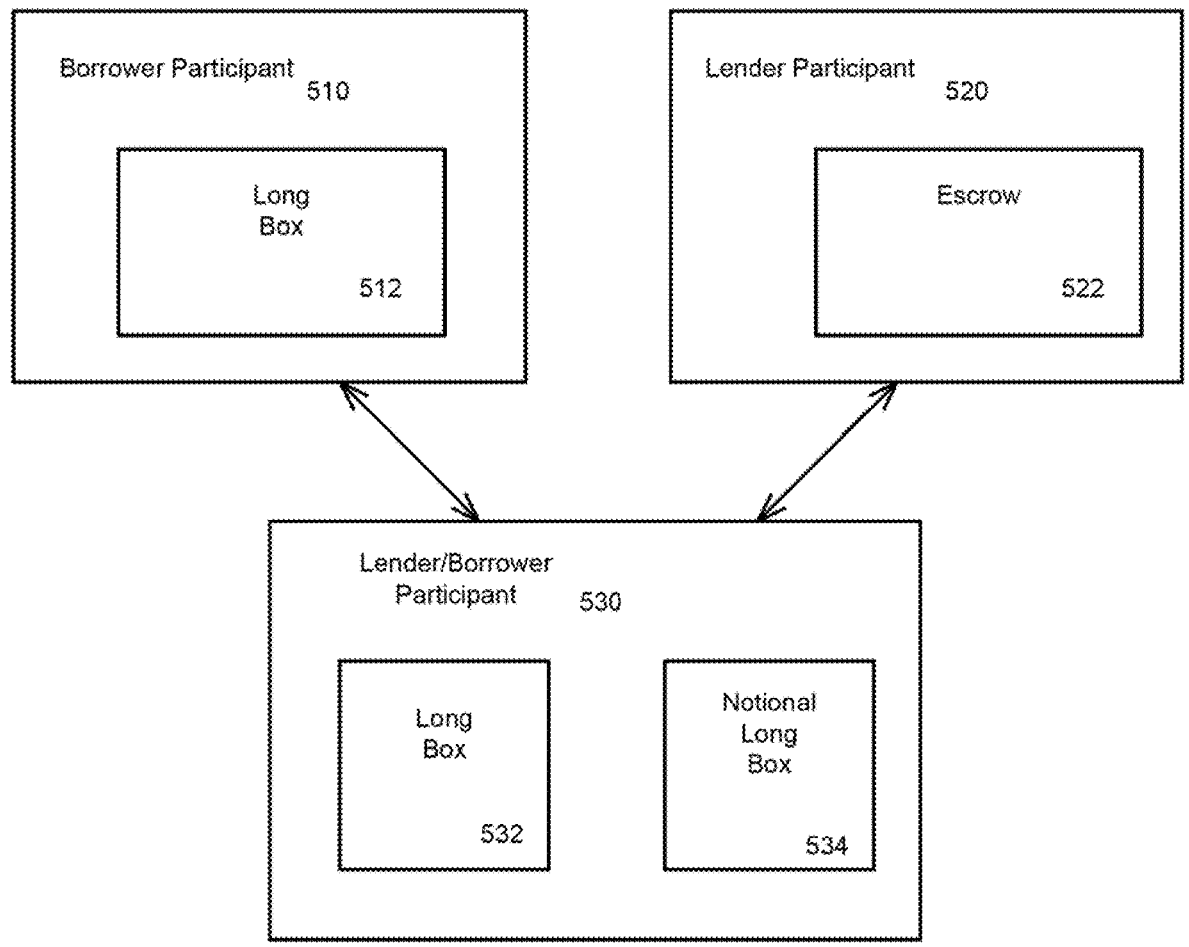
FIG. 5 is block diagram illustrating collateral flow between participants in accordance with an embodiment of the invention.

FIG. 5 is block diagram illustrating collateral flow between participants in accordance with an embodiment of the invention. A lender participant 520 having escrow 522 is shown. A borrower participant 510 stores assets in a long box 512. The assets in the long box 512 are available as collateral to a lender/borrower participant 530. The lender borrower 530 may have both a long box 532 and a notional long box 534. The notional long box 534 is a pool of assets that is made up of the securities held in the lender/borrower's escrow accounts—i.e. those assets the borrower/lender participant 530 has received as part of lending activity and is willing to re-use to satisfy its own borrowing obligations. Borrower/lender participants 530 can decide which escrow accounts they wish to include in the notional long boxes 534. The notional long box 534 contains all the re-usable assets for a given lender/borrower. As set forth above, participants cannot re-use the same piece of collateral more than once. Once a participant has enrolled, the system treats all the assets the participant has delivered as a single portfolio of assets.

The components shown in FIGS. 1-5 above may be or include a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc. that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM ALX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowchart of FIG. 6 or those described in conjunction with FIGS. 1-5 and 7-9. Such a set of instructions for performing a particular task may be characterized as a program, software program, software, engine, module, component, mechanism, or tool. The rehypothecation system 300 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Figure 6A:
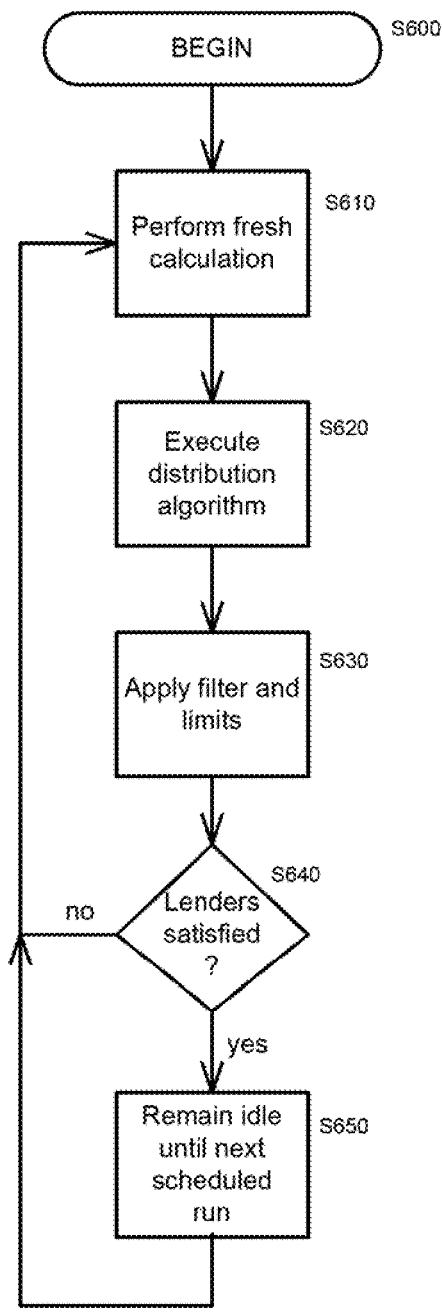
FIGS. 6A and 6B are flow charts illustrating a rehypothecation method in accordance with embodiments of the invention.

FIG. 6A is a flow chart illustrating a generalized rehypothecation method in accordance with an embodiment of the invention. The method begins in S600 and the system performs a fresh calculation in S610. Once the minimum fresh calculation is completed, the allocation cycle begins. The allocation cycle introduces the allocation engine's parameters and operates on all available re-usable assets. In S620, the rehypothecation system executes the distribution algorithm. In S630, the system applies the lender filter and limits. In S640, the system determines if all lenders have been collateralized. If the lenders have not been collateralized in S640, the system returns to the fresh calculation of S610 and repeats the allocation cycle. Thus, if there are still uncollateralized lenders, the whole process begins again, including the fresh calculation. Eligibility and concentration limits are the main reasons for failure of the first cycle to meet all the obligations for rehypothecation lender/borrowers. For all borrowers, there might simply be an insufficient supply of collateral. If the lenders have been collateralized in S640, the system remains idle in S650 until the next scheduled run.

Because the system is a global system that operates across continents, embodiments of the invention require continuous operation across time zones. Thus, the system may operate without a closing time as determined by the global synchronization components. With global system, no common closing that triggers timing for underlying obligations exists across the multiple markets. The system operates in view of the ongoing obligation to ensure collateralization of lenders. In accordance with system rules, no lender can be worse off following an allocation run than prior to the allocation run. As set forth above, the system may maintain a snapshot of the system after the last run for purposes of comparison to ensure that participants do not suffer from a reduction in collateral.

Figure 6B:
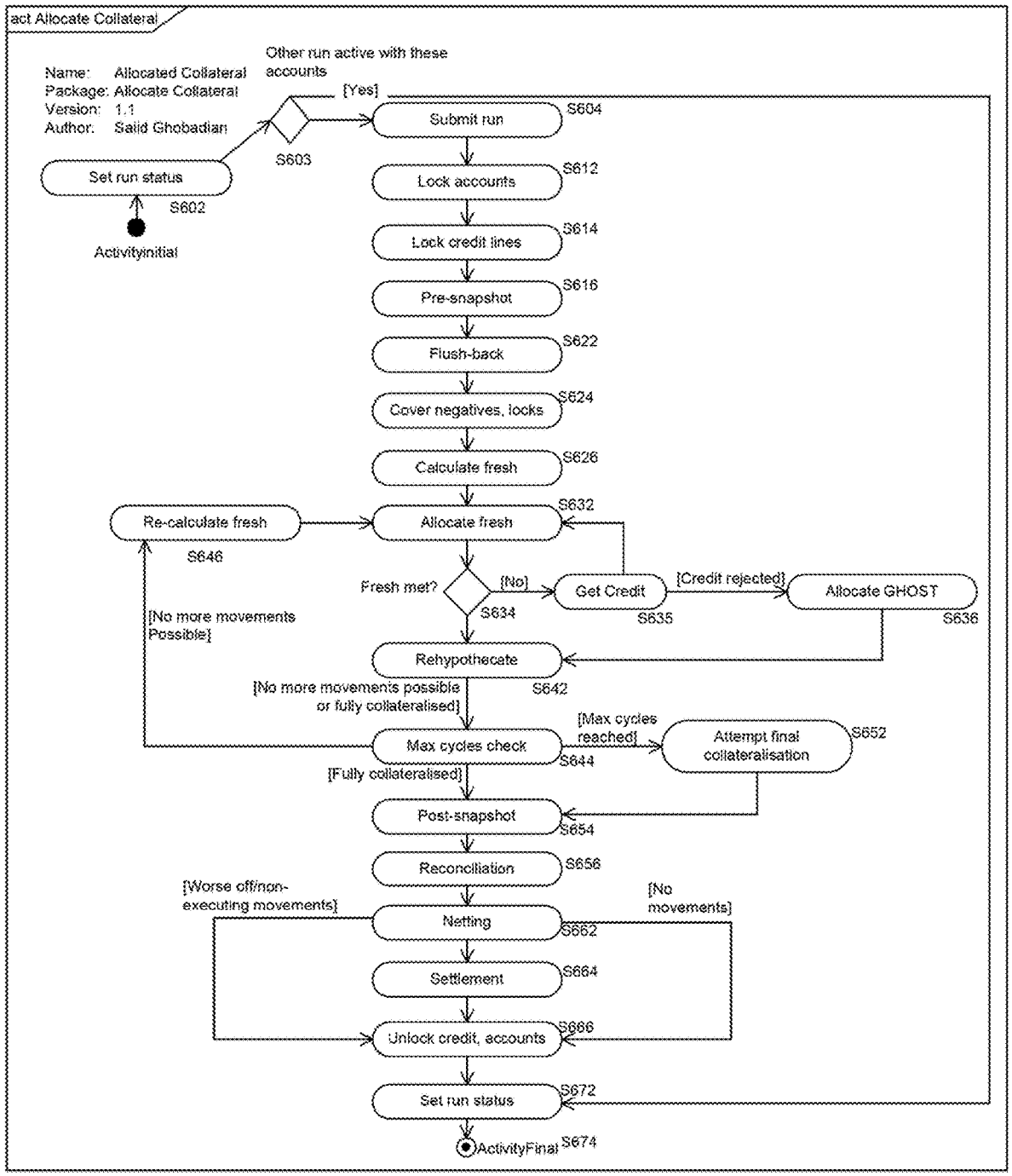

FIG. 6B is a flow chart illustrating additional details of a method for collateral allocation in accordance with an embodiment of the invention. In S602, the system sets run status. The system changes the scheduled run status from DLY (delayed) to SUB (submitted) to indicate that the run is active. If another run is active in S603 that includes any collateral accounts or credit lines included in this profile, an alternate flow (not illustrated) may be executed. However, if no other runs are active, the run is submitted and the status of the run changes to RUN (running) in S604.

In S612, the system may lock collateral accounts or of participants in this run profile. Furthermore, assuming the allocation run is a rehypothecation run, the system locks credit lines as well in S614 so that the credit line cannot be used by any other process (manual or automated), whilst the run is in progress. In preferred embodiments of the invention, during the rehypothecation run, trades requiring credit will be held and an appropriate warning displayed to users.

In S616, the system records a pre-allocation snapshot of positions in all participating long boxes and collateral accounts. The pre-allocation snapshot may record: the starting positions of all accounts; valuations; haircuts (percentage subtracted from par value of assets used as collateral), concentration limit strips; and RQV (required value or collateral value that must be allocated).

In S622, flush-back procedures may be implemented. The system now considers all assets, regardless of where the asset is currently allocated (long box, pledged to escrow, or re-used), to be back with the original collateral introducer. The system also unwinds any automatically created credit. If credit is required, it will be re-created using optimal assets. Each participant's credit line may be adjusted to reflect the value of the unwind.

In S624, the system places assets to cover negative settled positions in participant long boxes or lender collateral accounts. The system further allocates locked securities to nominated accounts.

In S626, the system calculates fresh collateral contributions. The fresh collateral obligation of each participant may be calculated by using a fairness algorithm or other technique. In a preferred embodiment, the fairness algorithm returns two values: one for lenders that accept rehypothecated assets and another for those that do not.

In S632, the system allocates fresh collateral. The system sequences borrowing participants and allocates fresh collateral to lenders. In embodiments of the invention, the system sequences borrowing participants alphanumerically. The system selects the next borrowing participant in the sequence. In a first iteration of the fresh allocation, the system assigns collateral type BQRs to securities in the participant borrower long box and allocates securities to appropriate allocation pools.

In subsequent runs, the system allocates from each pool in the sequence specified. Thus, when allocating, the system selects the next security in the sequence, The asset selection sequence may be in pool/BQR order for rehypothecation parties The first pool is selected and the assets in the pool are sorted into BQR order by the system. Once complete, or if no assets are present, the next pool is selected and this process is repeated until all the pools have been sorted into BQR order. In embodiments of the invention, the pools are searched in the following order: (1) available; (2) reserved for market trades; (3) reserved for ITF; and (4) ghost. The system selects the next lender collateral account according to an escrow selection sequence.

In S632, fresh collateral is allocated. The next asset is selected in the order established during the asset ordering process and allocated to the next lender. Several checks are then performed in turn. If any checks fail, the next lender in the sequence is selected. First, the system checks that the lender account actually requires collateral by checking, for each asset in turn, the total of the collateral held by the escrow account. The collateral held must be greater than RQV.

As a second check, the system also checks eligibility. The system ensures that the asset is eligible for the lender by checking -the asset against the lender's eligibility criteria. As a third check, the system conducts a previous receipt check to ensure that that the asset has not been received by the participant previously. In this check, the system determines if the borrower code attached to this participant has previously received this instance of asset.

In a fourth check, the system conducts a date analysis. The record date window of the asset, must fall inside of a predetermined window. A fifth check assesses collateral against the concentration limits: Concentration limits may fall into four groups including (a) cross account group concentration limits; (b) cross account concentration limits; (c) group concentration limits; and (d) concentration limits. All four of these limits can apply in turn. The system evaluates each asset to ensure that the strictest of the limits is not broken and to ensure that none of these limits is broken individually. For example, a set of lender accounts could be part of a cross account group concentration limit. Once the group of accounts has reached its limit, then no more collateral can be allocated even though the individual accounts' concentration limits have not been reached.

A sixth check involves calculation of the amount of collateral that can be allocated. The system allocates the asset by board lot size while observing the concentration limits. The system calculates the collateral value of the asset it has allocated and reduces the collateral total accordingly. The asset movement is recorded (i.e. source and destination accounts). A seventh check examines remaining assets by establishing if all of the holding has been allocated. If there is any holding in the asset remaining, it will be assessed against the next lender. An eighth check ensures that the RQV has been reached.

In S634, after performing all of the aforementioned checks, the system determines whether a require minimum amount of fresh collateral has been allocated and continues with allocation of S632 until the required amount is allocated, no more collateral accounts appear in the sequence, or no more of this security remains.

In S635, an alternate flow may be implemented in order to obtain credit for use as collateral. The system repeats steps involved in the allocation procedures described above until no more borrowing participants appear in the sequence In S642, the system rehypothecates received collateral. The rehypothecation process may involve steps including: sequencing borrowing participants alphanumerically; selecting the next borrowing participant in the sequence; allocating received securities to appropriate allocation pools; selecting the next security in the sequence using the initial collateral provider's BQR; selecting the next lender collateral accounts according to an escrow selection sequence and which is nominated for inclusion in the rehypothecation run. Finally, the system determines how much collateral can be rehypothecated considering: (a) collateral required (including amount that can be allocated, how much is remaining, etc); (b) eligibility; (c) record date; and (d) concentration limits as described above with reference to allocation.

The system may repeat the selection of the next lender and the determination how much collateral can be rehypothecated until no more collateral accounts appear in the sequence. Additionally, the system repeats the selection of the next security, the next lender and determination of collateral amount until collateral accounts attached to each of the participant lender escrows are fully collateralized or no more securities appear in the sequence. Furthermore, the system may repeat all of the above rehypothecation procedures until no more borrowing participants appear in the sequence.

In S644, the system conducts a maximum cycles check. The system repeats collateral fresh calculation and allocation, incrementing the iteration number on each loop, until any one of the following conditions is true: lender accounts of borrowers participating in the rehypothecation run are collateralized; no further collateral movements possible; and the iteration number is equal to the maximum number of permitted iterations. If the maximum cycle number has been reached, the system attempts final collateralization in S652.

After rehypothecation of S642, the system takes a post-allocation snapshot in S654 of positions in participant long boxes and escrow accounts. In S656, the system reconciles the sum of fresh collateral allocated with the sum of collateral allocated to participants excluding collateral that is rehypothecated. Thus, all movements from all long boxes must equal all receipts into all escrows less those movements that are escrow to escrow. An exception flow is provided to account for situations where the reconciliation fails.

The system executes netting in S662. The system reconciles the pre- and post-allocation snapshots of each participant account. From the comparison, the differences are identified and a list of movements is created to satisfy those differences. Based on identification of these differences in S662, the system will either continue to settlement in S664 or will unlock credit accounts in S666 without settling if either no movements have occurred or if the movements have left participants in a worse position. The run status may be reset in S672 and the activity becomes final in S674.

Figure 7:
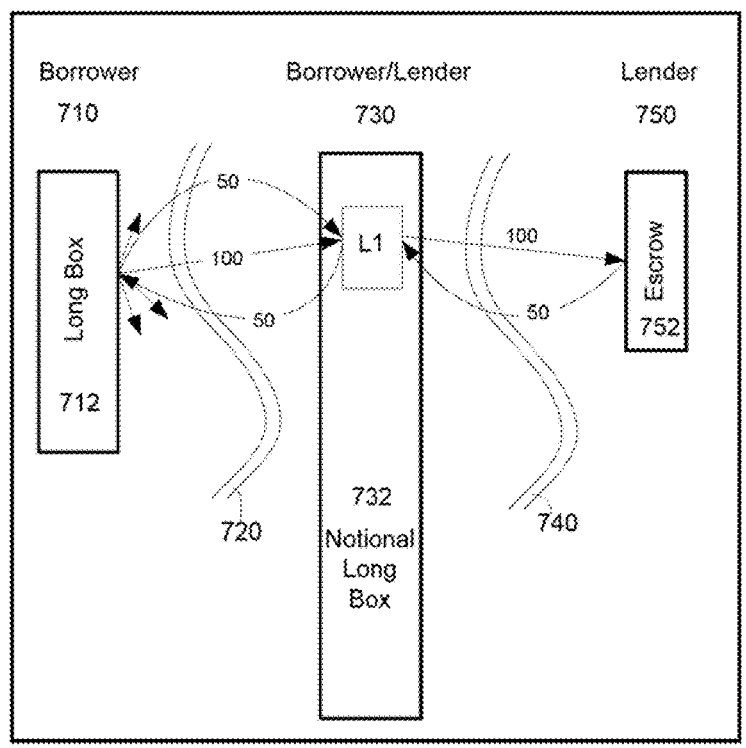
FIG. 7 is a block diagram illustrating collateral flow during a recall operation in accordance with an embodiment of the invention.

FIG. 7 is a block diagram illustrating collateral flow during a recall operation in accordance with an embodiment of the invention. During rehypothecation, only the collateral introducer can recall a line of stock or withdraw securities from the program. It is the responsibility of each borrower participant in a transaction along a rehypothecation chain to ensure that its lenders are collateralized.

In the displayed embodiment, a borrower/lender 730 has re-used all of the assets given to it by a borrower 710 to satisfy its obligations with a lender 750. The borrower 710 recalls fifty units of its assets and replaces them with fifty units of another asset from its long box 712. The allocation engine will attempt to execute the requested recall by determining whether the substitute assets are acceptable to the borrower/lender 750. In this instance, the allocation engine determines that the substitute assets do not meet the eligibility requirements of the lender 750. The allocation engine tries to execute the recall and passes the substitute assets through the filter 720 to determine if they are acceptable to the borrower/lender 730. In this instance the substitutes are acceptable to the lender/borrower 730. However, the substitutes do not pass through the eligibility filter 740 for the lender 750 and are therefore unacceptable to the lender. The allocation engine will not leave a lender exposed and therefore the allocation engine will cause the recall to fail.

Recalls in rehypothecation will place a great demand on liquidity because of the potentially increased distance, in terms of participants, between the introducer of the collateral and the current location of that collateral. This reduces the likelihood of recalls and substitutions being successful.

In order to mitigate the increased risk resulting from recalls in a global rehypothecation system, a number of risk mitigation measures may be implemented. Two of these risk mitigation measures are described below with reference to FIGS. 8 and 9. As an initial measure, a program-wide limitation may be placed on the percentage of assets allowed to be rehypothecated. This measure is described in greater detail with reference to FIG. 8 below. By limiting the collateral re-use to a set percentage, for example 50%, the rehypothecation system increases the likelihood that a participant will be able to satisfy the recall because 50% of the received assets are sitting unused in the participant's notional long box. The system-wide limitation on the amount of re-use allowed may be based on the required value of the notional long box.

Figure 8:
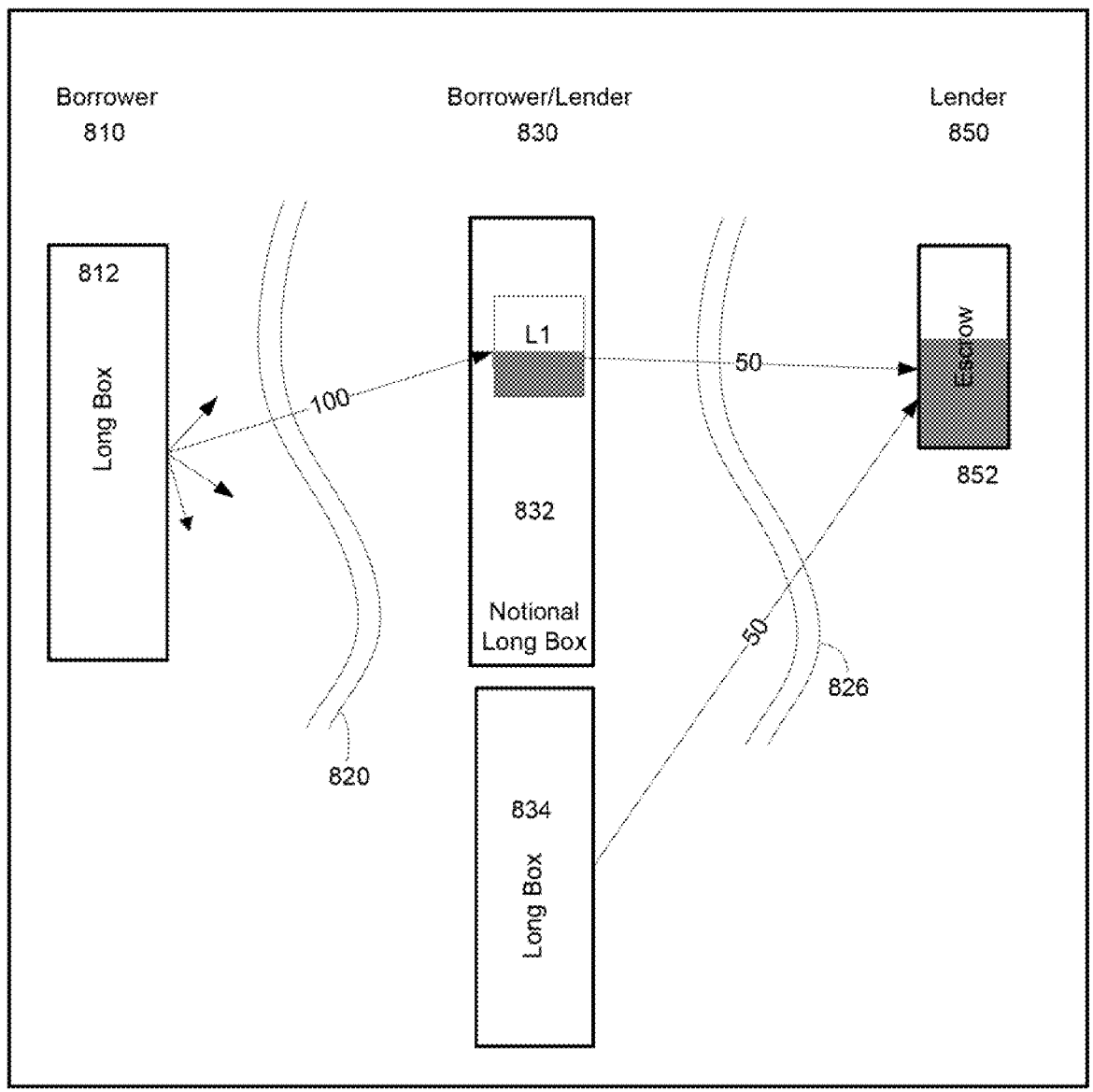
FIG. 8 is block diagram illustrating imposition of a system-wide limit on a percentage of assets available for rehypothecation in accordance with an embodiment of the invention.

FIG. 8 is block diagram illustrating impositions of a system-wide limit on a percentage of assets available for rehypothecation in accordance with an embodiment of the invention. The percentage is based on the total received RQV rather than the actually received collateral. An optimum percentage value may be derived during testing. Eventually, the system objective is to have a value approaching 100%. In the illustrated scenario, the system imposes a 50% limit on the amount of collateral that can be re-used. A borrower/lender 830 receives one hundred units of collateral passed through a filter 820 from a long box 812 belonging to a borrower 810. The borrower/lender 830 rehypothecates fifty units of that collateral from a notional long box. 832 belonging to the borrower/lender 830. The borrower/lender 830 then uses a further fifty units of fresh collateral from a long box 834 belonging to the bower/lender 830. This collateral passes through a filter 826. The borrower 810 issues a recall and the recall is executed during an allocation run of the allocation engine. The time that the recall is executed is set at a participant level and per market by the global synchronization engine. In order to satisfy the recall, the allocation engine returns all collateral to the originators and then re-allocates to meet all obligations.

Figure 9:
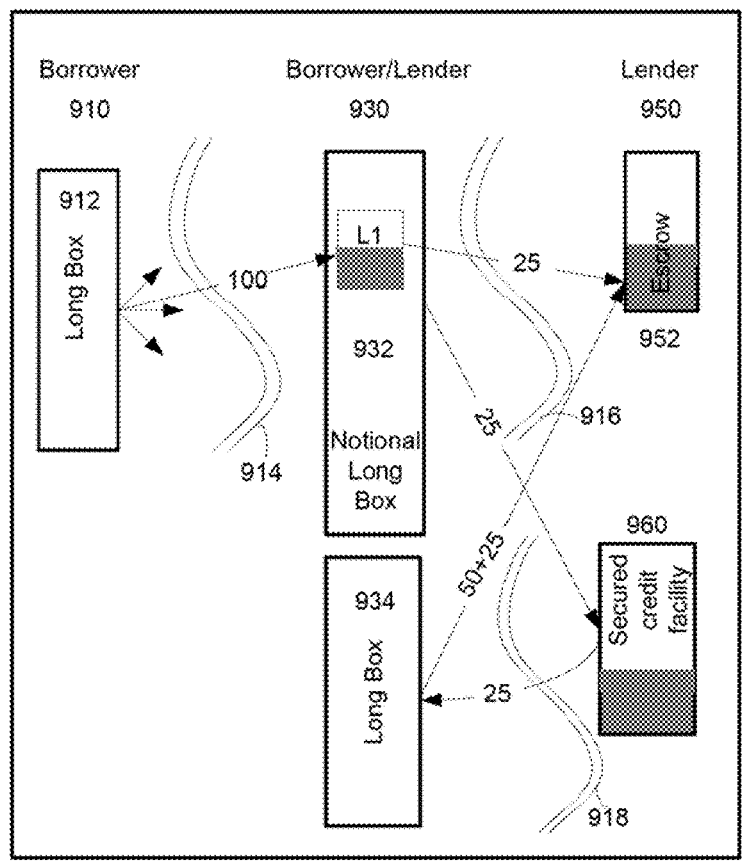
FIG. 9 is a block diagram illustrating a secured credit model of the rehypothecation in accordance with an embodiment of the invention.

FIG. 9 is a block diagram illustrating a further risk mitigation measure that includes a secured credit model of the rehypothecation system in accordance with an embodiment of the invention. Eligible participants may automatically utilize the automated secured credit model throughout the allocation day to provide liquidity. The credit line will be clearly visible to borrower participants. The borrower participants will be expected to close out the credit line before the final allocation run of the day. In order to participate in the secured credit model, participants must accept cash as part of their eligibility.

FIG. 9 illustrates a borrower 910 having assets in long box 912 and a borrower lender 930 having assets in notional long box 932 and in a long box 934. A lender 952 holds escrow 952. A credit facility 960 is also provided for interaction with borrower/lender 930. In the illustrated example, the lender 950, through a filter 916, refuses to accept any of the substitute collateral or any of the collateral that's been held aside in the 50%. The available collateral is then tested against the eligibility requirements through filter 918 of the credit facility to 960 to provide secured credit. In the illustrated example, twenty five units of collateral were eligible. The credit facility 960 then extended cash to the borrower/lender 930 and deducted the available credit line, taking into account the collateral held against it.

Thus, embodiments of the invention allow for the use of credit as fresh collateral. Credit may be used, for example, when the system determines that the participant's minimum fresh collateral has not been allocated and no more securities appear in the sequence to allocate. The system allocates to lender collateral accounts any cash credit that was successfully created by system procedures for implementing a credit line. If minimum fresh collateral requirement are still unmet, the system considers assets from the "reserved for market" trades and "reserved for ITF" pools before pausing the run and requesting a credit extension for the participant. If the credit line extension is rejected, the system resumes the run and considers GHOST assets to meet any outstanding RQVs. GHOST assets are not rehypothecated. The credit line may also be used, for example, when the system determines that the participant's borrowing obligations have not been met and no more securities appear in the sequence to allocate. In this instance, the system allocates to lender collateral accounts any cash credit that was successfully created by system procedures.

As an additional risk mitigation measure, the rehypothecation system will not allow collateral to be rehypothecated outside of the system. Thus, securities will remain within control of the rehypothecation system, with movements being represented solely by book entries without settlement risk. Furthermore, there will be no market movements within the rehypothecation system.

As an additional risk mitigation measure, lenders accepting rehypothecated assets will not be able to lock their accounts. Locking an account containing rehypothecated assets might prevent a recall from being satisfied because any asset in the locked account will be fixed. Another risk mitigation measure is the "Not-worse-off mode" of the allocation engine that will continue to operate to ensure that allocation runs will complete so long as no lender is worse-off post-allocation run than pre-allocation runs. Where RQVs have changed or the value of collateral has altered due to price changes, allocation runs will still complete and recalls will still be satisfied so long as the lenders are not in a worse position, from a collateralisation perspective, than they were at the start of the run.

As a further risk mitigation measure, the reporting engine may prepare a report for participants who do not collateralise their lenders, highlighting potential assets that could fulfil their obligations. The report informs the collateral provider, whether a lender/borrower or a pure borrower, of what type of collateral is necessary to satisfy obligations and thus increases the likelihood that the following run will complete.

Furthermore, to ensure that participants have an accurate and timely view of their current, frequent and scheduled allocation runs are executed. Since the collateral picture will be changing, the frequency and regularity of runs ensures that recalls have every chance of being met.

Finally, in addition to the system implemented risk mitigation measures, participants can individually undertake measures to ensure recalls execute smoothly. Lenders, who wish to re-use their assets, can align their incoming eligibility with the asset criteria they accept for their own obligations. The more lender/borrowers actively manage their lending/borrowing books, taking advantage of frequent allocation runs, the more liquid the program will be.

Figure 10A:
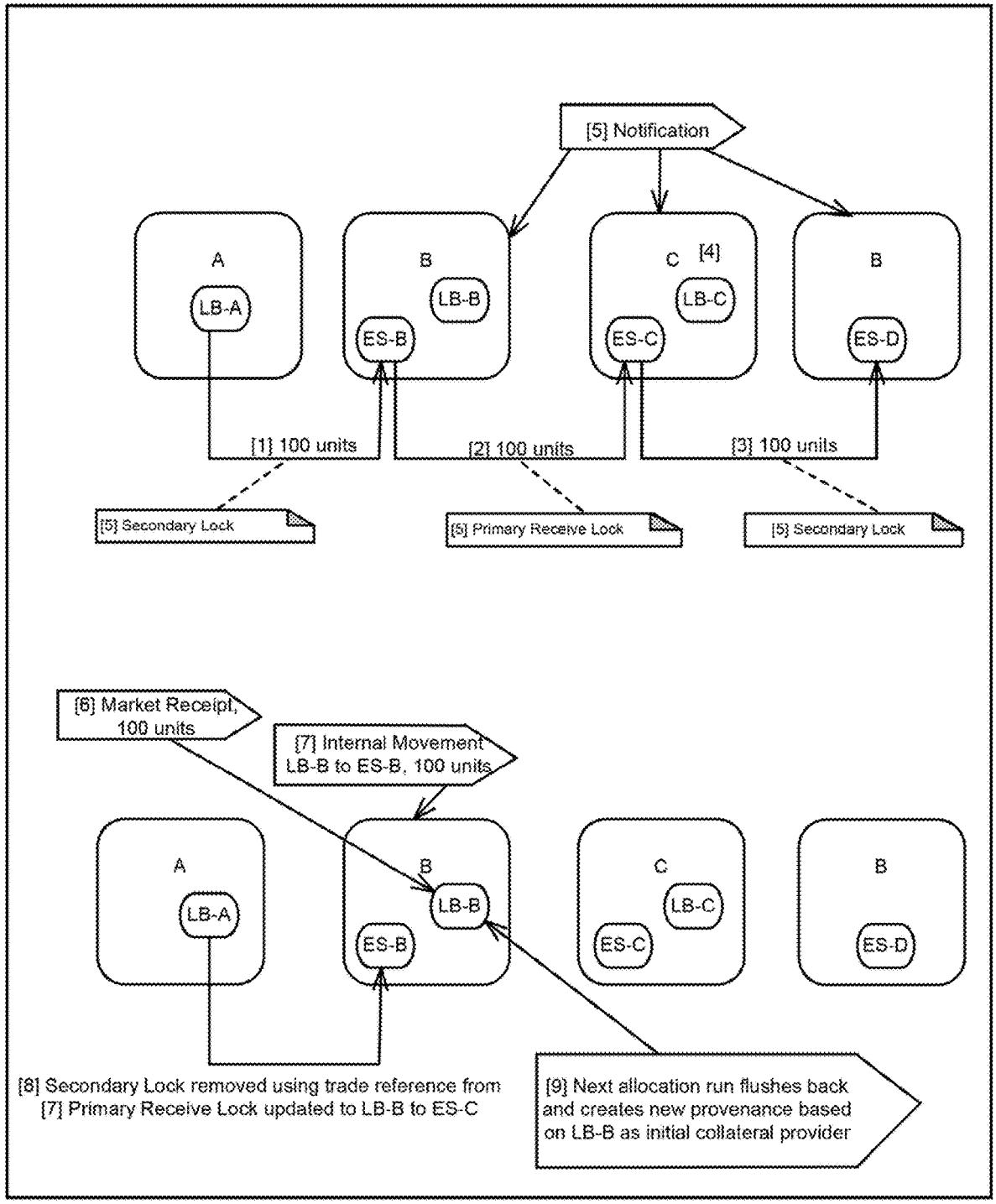
FIGS. 10A-10C illustrate a default handling method in accordance with an embodiment of the invention.
Figure 10C:
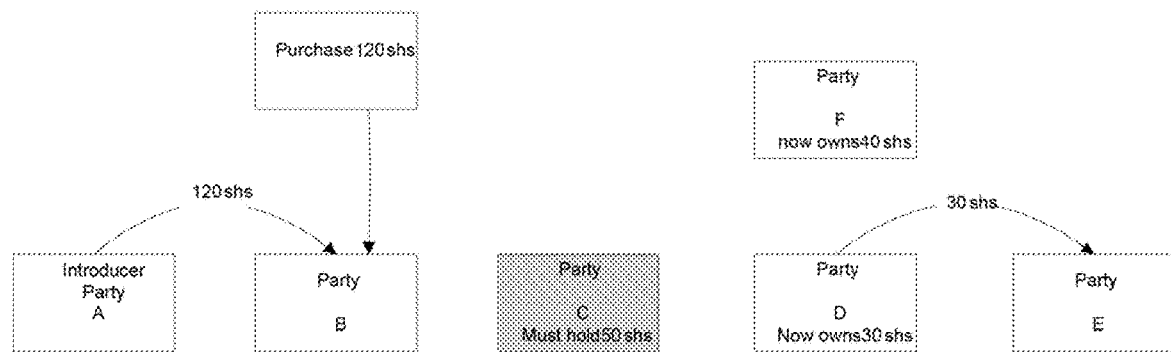
Figure 10B:
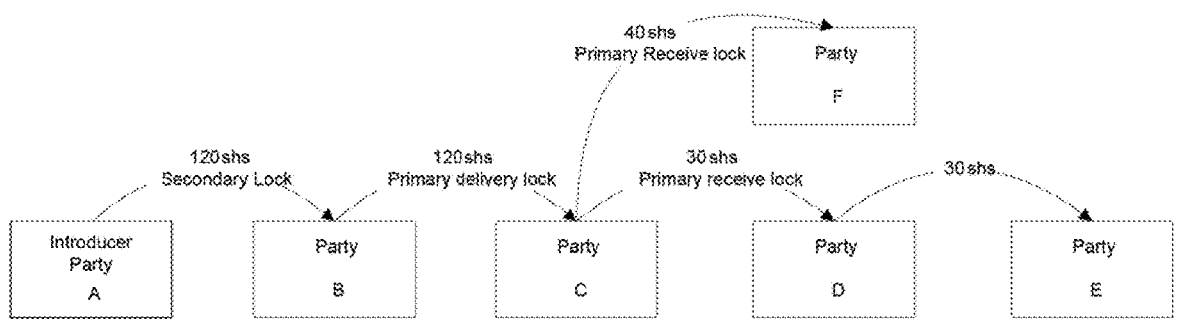

FIGS. 10A-10C illustrate default handling procedures in accordance with embodiments of the invention. If a party goes into default, the default handler requires the ability to lock assets in the party's long box and escrow accounts where it is acting as collateral receiver pending liquidator review. As illustrated in FIG. 10A, each party A-D includes at least one of an escrow account (ES) and a long box (LB). Party C has gone into default, while being an active participant in a rehypothecation profile.

Procedurally, reference numeral [1] indicates that party A introduced fresh collateral from its long box to collateralize party B's escrow account. As shown by [2], party B re-used that collateral to collateralize party C's escrow account. Next, as shown by [3], party C re-used that collateral to collateralize party D's escrow account. As shown by [4], party C was declared bankrupt and its assets were frozen.

As indicated by reference numeral [5], the default handler puts locks in place so that all assets that flow to party C are frozen and then all assets that flow from party C are also frozen. That is all assets that are already allocated must remain allocated. No other asset should be allocated for parties directly connected to the defaulter, i.e. B-C, C-D or C-F. Effectively, none of these accounts should be re-valued once the default has occurred. As instructed by the default handler, the system e-mails or otherwise notifies all parties who are dealing directly with party C to advise of the default. The system will display an error message so that if the collateral introducer (A) tries to withdraw collateral while the party default lock is in place, the withdrawal of the collateral is prevented.

Primary party default receive locks are placed on the incoming escrows of the defaulter and primary party default deliver locks are placed on the outbound escrows of the defaulter. Secondary locks may be placed on all other escrows back to the initial collateral provider(s). In preferred embodiments, no locks are placed after the primary party default deliver locks for participants further down the chain.

As a result of these actions, the scenario shown in FIG. 10B occurs. As shown in FIG. 10B, party C is removed from the chain. A primary delivery lock is placed on transmission from party B to party C and a primary receive lock is placed on transmission from party C to party D. A secondary lock is placed on the shares from party A, the introducer, to party B. A primary receive lock is placed on a transmission from party C to party F. However, party D is able to transmit thirty shares to party E. As illustrated, although during the next and any subsequent rehypothecation run after the default, party C must still participate in the run, effectively the chain must end with party C, but with the original value of the collateral at the time of the default. Only the assets locked can be allocated for parties D and F. Once parties D and F have claimed the assets, the rehypothecation chain recommences with party D or F as the introducer. Until the assets are claimed, party C must still allocate to parties D and F, but only what was allocated at the time of default, regardless of any price fluctuations.

Returning to FIG. 10A, as indicated by reference numeral [6], parties receiving assets (the chain from the defaulter onwards) must be able to perform various actions including: delivery free of payment (DFP); delivery against payment (DAP); and internal transfer (ITF) from the account to another registered account.

As illustrated by reference numeral [7], internal movement between party B long box and party B escrow remains possible. Furthermore, in embodiments of the invention, it remains possible to substitute collateral from party C to an onward party in an emergency, or with agreement from the creditors. This action may, in embodiments of the invention, be handled manually.

As illustrated by reference numeral [8], the secondary lock between party A and party B may be removed and the primary receive lock may be updated to exist between the long box of party B and the escrow of party C.

As illustrated by reference numeral [9] in FIG. 10A, parties who have delivered to the defaulting party C must be able to replace collateral in the program. Therefore party B must provide the assets that were allocated to party C and that will not be returned. When this is done, this replacement asset should now act as if the end of the chain is with party B. When the assets are delivered by party B these should be assigned to whatever depot needs the asset due to the default of party C. Upon completion, the primary receive lock may automatically be removed.

Ultimately, the default handler resolves the default as shown in FIG. 10C. Party C should be removable from the rehypothecation program. All assets that are received from another party and remain with party C should be available to be removed by the system or system administrator. These removed assets remain party C's assets, and all provenances to the initial party introducer should be removed.

Responsibilities of party B include providing the assets that were allocated to party C and that will not be returned. The replacement assets provided by party B should now act as if the end of the chain is party B. When the replacement assets are delivered by party B, the default handler may assign these assets to whatever depot needs the asset due to the default of party C. Once the replacement asset has been provided party B, should be able to remove party C from its allocation profile.

Parties D and F have the ability to remove the assets that have not been rehypothecated onward from the program. Assets that have been rehypothecated away need to be assigned so that party D is now seen as the introducer. This removal of assets must be independent of party B's purchase of the asset. As assets are removed from the program, the RQV must be maintained and the escrow must continue to appear collateralized.

All existing functions that manage collateralization should be examined by the default handler and the impact of the default established. In embodiments of the invention, any accounts under-collateralized at the time of default may be collateralized manually.

In addition to a participant default, it may also be possible to declare an individual escrow in default. In this case, all assets allocated to the escrow must remain allocated. If the participant associated with the defaulting escrow has other escrow agreements, these must continue to allocate in an unencumbered manner.

Accordingly, a system and method have been provided that allow for un-limited re-use of assets as long as the same participant doesn't reuse an asset more than once. The system is also fully automated and supports multiple asset types including equity and non-equity. Furthermore, the system operates globally, operates regardless of the underlying obligation, and clearly assigns voting and income rights with respect to the collateral introducer and collateral receiver.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A system for displaying a default error message and freezing transmitting and receiving of data during a default comprising:
   a plurality of the computer processors, each transmitting data over a network to at least two of the plurality of computer processors and each receiving data over the network from at least two of the plurality of computer processors;
   a plurality of display devices each connected to one of the plurality of computer processors;
   a non-transitory computer memory storing rules for performing allocation runs, pre-set borrower-selected and lender/borrower-selected parameters, and lender and lender/borrower requirements, the stored rules permitting transmitting of data representing rehypothecation of both the equity and the non-equity collateral assets; and
   a first computer processor of the plurality of computer processors accessing the non-transitory computer memory, the first computer processor being programmed to:
   operate as a default handler to
      identify a defaulting participant in a rehypothecation chain of computer processors stored in the non-transitory computer memory,
      instruct, via the network, display devices, of the plurality of display devices, of participants in the rehypothecation chain other than the defaulting participant to display a default notification message,
      place, via the network, primary party default receive locks on inbound escrows incoming to a computer processor of the defaulting participant of the plurality of computer processors directly from other computer processors of the other participants in the rehypothecation chain,
      place, via the network, primary party default deliver locks on outbound escrows outbound from the computer processor of the defaulting participant directly to other computer processors of the other participants in the rehypothecation chain,
      the placing of the primary party default receive locks and the primary party default deliver locks freezing all assets flowing to and from the computer processor of the defaulting participant, and
      remove the defaulting participant's computer processor from the rehypothecation chain,
      the participants in the rehypothecation chain including borrowers, lenders, and lender/borrowers;
   calculate fresh collateral obligations via a fairness algorithm to determine a first value associated with lenders and lender/borrowers accepting rehypothecated assets and a second value associated with lenders and lender/borrowers not accepting rehypothecated assets,
   operate as an allocation engine to access the stored rules and redistribute the collateral in accordance with the stored rules, wherein the allocation engine includes:
      collateral distribution components configured to assign the collateral to the lenders and the lender/borrowers based on the borrower-selected parameters pre-set by the borrowers and lender/borrowers, wherein assigning the collateral includes sequencing borrowers, assigning the collateral to allocation pools, sorting the collateral in the allocation pools by a borrower quality ranking, and performing allocation sequentially by borrower and allocation pool, and
      an eligibility filter configured to verify each assignment of the collateral in accordance with the lender and lender/borrower requirements, wherein the allocation engine is configured to allocate the fresh collateral based on the first value and the second value, and to rehypothecate the re-used collateral upon allocation of a minimum amount of fresh collateral, wherein the rehypothecation includes selecting each borrower and lender/borrower in sequence until no borrower or lender/borrower remains, wherein the stored rules allow an unlimited number of re-use instances of each collateral asset and restrict each collateral asset from being rehypothecated by any single participant more than one time; and
   operate as a global synchronization engine predetermining timing of the allocation runs, thereby enabling collateral re-use across time zones, wherein the global synchronization engine defines an overnight period for each time zone, determines at least one overlapping period between the time zones, and identifies collateral shortages for the collateral in one time zone and collateral availability of the collateral in another time zone during the overlapping period to achieve greater efficiencies.

2. The system of claim 1, wherein the at least one computer processor further operates as a credit engine providing a temporary line of credit between the allocation runs to eligible participants, wherein the eligible participants are selected from the system participants.

3. The system of claim 1, wherein the allocation engine further comprises recall execution components executing a recall requested by a collateral introducer, wherein the collateral introducer is one of the system participants.

4. The system of claim 1, wherein the at least one computer processor further operates as a fulfillment determination component ensuring all lenders and lender/borrowers are collateralized in accordance with system requirements at the conclusion of each allocation run.

5. A computer-implemented method for displaying a default error message and freezing transmission and receiving of data during a default, the method comprising:
   transmitting data over a network among a plurality of the computer processors;
   displaying data transmitted over the network from at least one of the plurality of computer processors on a plurality of display devices each connected to one of the plurality of computer processors;
   storing in a non-transitory computer memory allocation rules for performing allocation runs, pre-set borrower-selected and lender/borrower-selected parameters, and lender and lender/borrower requirements, the stored rules permitting transmitting of data representing rehypothecation of both the equity and the non-equity collateral assets;

accessing the non-transitory computer memory with a first computer processor which operates as a default handler to
identify a defaulting participant in a rehypothecation chain of participants and their computer processors that transmit and receive data to and from each other, the rehypothecation chain being stored in the non-transitory computer memory,
instruct, via the network, display devices, of the plurality of display devices, of participants in the rehypothecation chain other than the defaulting participant to display a default notification message,
place, via the network, primary party default receive locks on inbound escrows incoming to a computer processor of the defaulting participant of the plurality of computer processors directly from other computer processors of the other participants in the rehypothecation chain,
place, via the network, primary party default deliver locks on outbound escrows outbound from the computer processor of the defaulting participant directly to other computer processors of the other participants in the rehypothecation chain,
the placing of the primary party default receive locks and the primary party default deliver locks freezing all assets flowing to and from the computer processor of the defaulting participant, and
remove the defaulting participant's computer processor from the rehypothecation chain,
the participants in the rehypothecation chain including borrowers, lenders, and lender/borrowers;
displaying on the display devices, of the plurality of display devices, of participants in the rehypothecation chain other than the defaulting participant a default notification message;
predetermining scheduling of allocation runs, with the first computer processor, through global synchronization facilitating participation by the participants in multiple different time zones, wherein a global synchronization engine defines an overnight period for each time zone, determines at least one overlapping period between the time zones, and identifies collateral shortages in one time zone and collateral availability in another time zone during the overlapping period to achieve greater efficiencies;
calculating fresh collateral obligations, with the first computer processor, by applying a fairness algorithm to determine a first value associated with lenders accepting rehypothecated assets and a second value associated with lenders not accepting rehypothecated assets;
performing the scheduled allocation runs, with the first computer processor, to redistribute the entered collateral assets by assigning the collateral assets to the lenders and the lender/borrowers based on the borrower-selected parameters, wherein assigning the collateral assets includes sequencing borrowers, assigning the collateral to allocation pools, sorting the collateral in the allocation pools by a borrower quality ranking, and performing allocation sequentially by borrower and allocation pool;
allocating the fresh collateral based on the first value and the second value;
rehypothecating the re-used collateral by selecting each borrower in sequence until no borrower remains, wherein the stored allocation rules allow an unlimited number of re-use instances of each collateral asset and restrict each collateral asset from being rehypothecated by any single participant more than one time; and
implementing, with the first computer processor, an eligibility filter to verify each assignment of collateral in accordance with the lender and lender/borrower requirements.

6. The method of claim 5, further comprising generating reports after each allocation run, the reports including long box reports and notional long box reports.

7. The method of claim 5, further comprising calculating a minimum amount of the fresh collateral required for a next allocation run.

8. The method of claim 5, further comprising providing a temporary line of credit between allocation runs to eligible participants among the system participants.

9. The method of claim 5, further comprising automatically executing a recall requested by a collateral introducer.

10. The method of claim 5, further comprising implementing a fulfillment determination component ensuring all lenders are collateralized at the conclusion of each allocation run.

* * * * *